United States Patent
Kubota et al.

(10) Patent No.: US 10,866,311 B2
(45) Date of Patent: Dec. 15, 2020

(54) DISTANCE MEASURING DEVICE

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Nobu Matsumoto, Ebina (JP); Yutaka Oota, Yokohama (JP); Saki Sato, Kawasaki (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 343 days.

(21) Appl. No.: 15/921,066

(22) Filed: Mar. 14, 2018

(65) Prior Publication Data
US 2019/0086522 A1    Mar. 21, 2019

(30) Foreign Application Priority Data
Sep. 15, 2017    (JP) .................................. 2017-178246

(51) Int. Cl.
*G01S 7/00*    (2006.01)
*G01S 7/4865*    (2020.01)
(Continued)

(52) U.S. Cl.
CPC ............ *G01S 7/4865* (2013.01); *G01S 7/487* (2013.01); *G01S 7/4863* (2013.01); *G01S 17/10* (2013.01); *G01S 17/42* (2013.01)

(58) Field of Classification Search
USPC ................................................ 356/4.01, 5.01
See application file for complete search history.

(56) References Cited

U.S. PATENT DOCUMENTS 7,554,652 B1    6/2009 Babin et al.
7,640,122 B2    12/2009 Levesque et al.
(Continued)

FOREIGN PATENT DOCUMENTS

CA    2 950 937 A1    6/2017
EP    3 118 750 A1    1/2017
(Continued)

OTHER PUBLICATIONS

European Search Report and Opinion for Application EP 18161460 (Year: 2018).*
English Machine Translation of EP 3182159 A1 (Year: 2015).*

*Primary Examiner* — James R Hulka
(74) *Attorney, Agent, or Firm* — Oblon, McClelland, Maier & Neustadt, L.L.P.

(57) ABSTRACT

A distance measuring device according to an embodiment includes a light source, an irradiation optical system, a light-receiving optical system, a sensor, an extractor, an adjuster, a signal generator, and a distance measurer. The light source intermittently emits laser light. The irradiation optical system reflects the laser light. The light-receiving optical system receives reflected light of the laser light via the mirror. The sensor includes a plurality of light receiving elements. The extractor extracts light receiving elements used for measurement of a distance to the measurement target object. The adjuster adjusts, according to an amplification factor corresponding to the light receiving elements extracted by the extractor, signal values of the electric signals of the light receiving elements. The signal generator generates time-series signals for measurement on the basis of the electric signals adjusted by the adjuster. The distance measurer measures the distance to the measurement target object.

20 Claims, 12 Drawing Sheets

(51) Int. Cl.
*G01S 7/487* (2006.01)
*G01S 17/10* (2020.01)
*G01S 17/42* (2006.01)
*G01S 7/4863* (2020.01)

(56) References Cited

U.S. PATENT DOCUMENTS

| | | |
|---|---|---|
| 7,895,007 B2 | 2/2011 | Levesque et al. |
| 7,917,320 B2 | 3/2011 | Levesque et al. |
| 8,242,476 B2 | 8/2012 | Mimeault et al. |
| 8,831,908 B2 | 9/2014 | Kamitani et al. |
| 10,048,376 B2 * | 8/2018 | Kubota .............. G01S 7/497 |
| 10,496,730 B2 * | 12/2019 | Mizoguchi .............. G07C 3/14 |
| 10,613,225 B2 * | 4/2020 | Kubota .............. G01S 7/4865 |
| 2009/0119044 A1 * | 5/2009 | Levesque .......... G01S 7/4868 702/69 |
| 2010/0039637 A1 * | 2/2010 | Levesque .......... G01S 7/4868 356/5.01 |
| 2010/0042362 A1 * | 2/2010 | Levesque .......... G01S 7/484 702/159 |
| 2011/0004578 A1 | 1/2011 | Momma et al. |
| 2011/0205521 A1 * | 8/2011 | Mimeault .......... G01S 17/42 356/4.01 |
| 2011/0246116 A1 * | 10/2011 | Kamitani .......... G01B 11/14 702/97 |
| 2016/0266253 A1 | 9/2016 | Kubota |
| 2017/0082746 A1 | 3/2017 | Kubota et al. |
| 2017/0103148 A1 | 4/2017 | Natsumeda |
| 2017/0109324 A1 | 4/2017 | Mizoguchi |
| 2017/0242109 A1 | 8/2017 | Dussan et al. |
| 2017/0363740 A1 | 12/2017 | Kubota et al. |
| 2018/0081040 A1 | 3/2018 | Kubota et al. |
| 2018/0128918 A1 | 5/2018 | Ota et al. |

FOREIGN PATENT DOCUMENTS

| | | | |
|---|---|---|---|
| EP | 3 125 057 A1 | 2/2017 | |
| EP | 3 182 159 A1 | 6/2017 | |
| EP | 3182159 A1 * | 6/2017 | .......... G01S 7/4817 |
| JP | 2000-252180 | 9/2000 | |
| JP | 2007-316016 A | 12/2007 | |
| JP | 2011-215005 | 10/2011 | |
| JP | 2016-139336 | 8/2016 | |
| JP | 2016-170114 | 9/2016 | |
| JP | 2018-44923 | 3/2018 | |
| JP | 2018-77088 A | 5/2018 | |
| WO | WO 2009/104324 A1 | 8/2009 | |
| WO | WO 2015/136586 A1 | 9/2015 | |
| WO | WO 2015/145500 A1 | 10/2015 | |

* cited by examiner

| ANGULAR VELOCITY | RELATION BETWEEN MEASURED DISTANCE AND COMBINATION OF LIGHT RECEIVING ELEMENTS |
|---|---|
| + ANGULAR VELOCITY LARGE | LIGHT RECEIVING ELEMENT 183⇒183+184⇒184⇒184+185⇒185 |
| + ANGULAR VELOCITY INTERMEDIATE | LIGHT RECEIVING ELEMENT 183⇒183+184⇒184 |
| ANGULAR VELOCITY SMALL | LIGHT RECEIVING ELEMENT 183 |
| − ANGULAR VELOCITY INTERMEDIATE | LIGHT RECEIVING ELEMENT 183⇒183+182⇒182 |
| − ANGULAR VELOCITY LARGE | LIGHT RECEIVING ELEMENT 183⇒183+182⇒182⇒182+181⇒181 |

FIG. 9

| ANGULAR VELOCITY | RELATION OF CONNECTION BETWEEN LIGHT RECEIVING ELEMENTS AND AD CONVERTERS (ADCS) |
|---|---|
| + ANGULAR VELOCITY LARGE | ADC210A: LIGHT RECEIVING ELEMENT 183⇒185、ADC210B: LIGHT RECEIVING ELEMENT 184 |
| + ANGULAR VELOCITY INTERMEDIATE | ADC210A: LIGHT RECEIVING ELEMENT 183、ADC210B: LIGHT RECEIVING ELEMENT 184 |
| ANGULAR VELOCITY SMALL | ADC210A: LIGHT RECEIVING ELEMENT 183 |
| − ANGULAR VELOCITY INTERMEDIATE | ADC210A: LIGHT RECEIVING ELEMENT 183、ADC210B: LIGHT RECEIVING ELEMENT 182 |
| − ANGULAR VELOCITY LARGE | ADC210A: LIGHT RECEIVING ELEMENT 183⇒181、ADC210B: LIGHT RECEIVING ELEMENT 182 |

FIG. 10

DISTANCE MEASURING DEVICE

This application is based upon and claims the benefit of priority from the prior Japanese Patent Application No. 2017-178246, filed on Sep. 15, 2017 the entire contents of which are incorporated herein by reference.

FIELD

Embodiments of the present invention relate to a distance measuring device.

BACKGROUND

There is known a distance measuring device called LIDAR (Light Detection and Ranging, Laser Imaging Detection and Ranging). The device intermittently irradiates laser light on a measurement target object via a rotating mirror and detects, with a sensor, via the mirror, reflected light reflected by the measurement target object. A round-trip time of light is longer as the distance from the distance measuring device to the measurement target object, that is, an optical path length is larger. Therefore, the distance can be measured using a time difference between timing when a light source emits the laser light and timing when the reflected light is detected.

On the other hand, an angle difference between a rotation angle of the mirror at timing when the laser light is irradiated and a rotation angle of the mirror at timing when the reflected light is made incident on the mirror is caused by the rotation of the mirror. It is necessary to expand, according to the angle difference, a range of an incident angle of the reflected light made incident on the sensor with respect to the mirror.

However, more environment light is received as the range of the incident angle is expanded. Therefore, it is likely that measurement accuracy of a distance is deteriorated.

BRIEF DESCRIPTION OF THE DRAWINGS

FIG. 9 is a diagram in which a relation between a measurement distance and a combination of the light receiving elements is summarized for each angular velocity of a mirror;

FIG. 10 is a diagram in which a relation of connection between the light receiving elements and AD converters is summarized for each angular velocity of the mirror;

DETAILED DESCRIPTION

Figure 1:
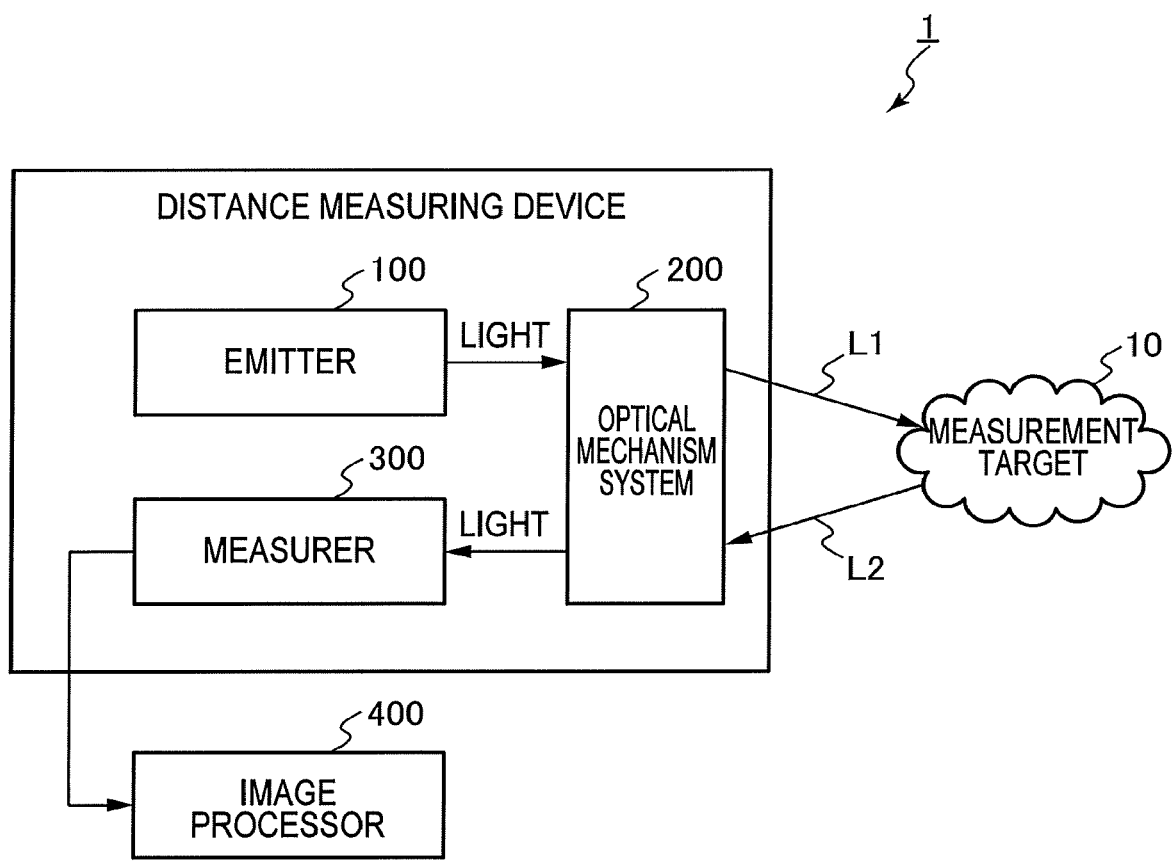
FIG. 1 is a diagram showing a schematic overall configuration of a distance measuring device 1 according to an embodiment.

Embodiments will now be explained with reference to the accompanying drawings.

A distance measuring device according to an embodiment includes a light source, an irradiation optical system, a light-receiving optical system, a sensor, an extractor, an adjuster, a signal generator, and a distance measurer. The light source intermittently emits laser light. The irradiation optical system reflects the laser light emitted by the light source on a mirror, which cyclically changes an angle of an incident surface with respect to the laser light, and irradiates the laser light on a measurement target object. The light-receiving optical system receives reflected light of the laser light via the mirror. The sensor includes a plurality of light receiving elements that convert the reflected light received via the light-receiving optical system into electric signals. The extractor extracts light receiving elements used for measurement of a distance to the measurement target object among the plurality of light receiving elements. The adjuster adjusts, according to an amplification factor corresponding to the light receiving elements extracted by the extractor, signal values of the electric signals of the light receiving elements. The signal generator generates time-series signals for measurement on the basis of the electric signals adjusted by the adjuster. The distance measurer measures the distance to the measurement target object on the basis of a time difference between light emission timing of the laser light and timing of a peak position of signal values of the time-series signals for measurement.

Note that an embodiment explained below are an example of embodiments of the present invention. The present invention is not interpreted to be limited to the embodiment. In the drawings referred to in the embodiment, the same portions and portions having the same functions are denoted by the same or similar reference numerals and signs. Repeated explanation of the portions is sometimes omitted. Dimension ratios of the drawings are sometimes different from actual ratios for convenience of explanation. A part of components is sometimes omitted from the drawings.

Embodiment

FIG. 1 is a diagram showing a schematic overall configuration of a distance measuring device 1 according to an embodiment. As shown in FIG. 1, the distance measuring device 1 generates a distance image of a measurement target object 10 using a scanning scheme or a TOF (Time Of Flight) scheme. More specifically, the distance measuring device 1 includes an emitter 100, an optical mechanism system 200, a measurer 300, and an image processor 400.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurer 300. The laser light means light having an aligned phase and an aligned frequency.

The measurer 300 measures the distance to the measurement target object 10 on the basis of the reflected light L2 received via a light-receiving optical system of the optical mechanism system 200. That is, the measurer 300 measures the distance to the measurement target object 10 on the basis of a time difference between timing when the emitter 100 irradiates the laser light L1 on the measurement target object 10 and timing when the reflected light L2 is measured.

The image processor 400 performs removal of noise, distortion correction, and interpolation processing and outputs final distance image data on the basis of distances to a plurality of measurement points on the measurement target object 10. The image processor 400 may be incorporated in a housing of the distance measuring device 1.

Figure 2:
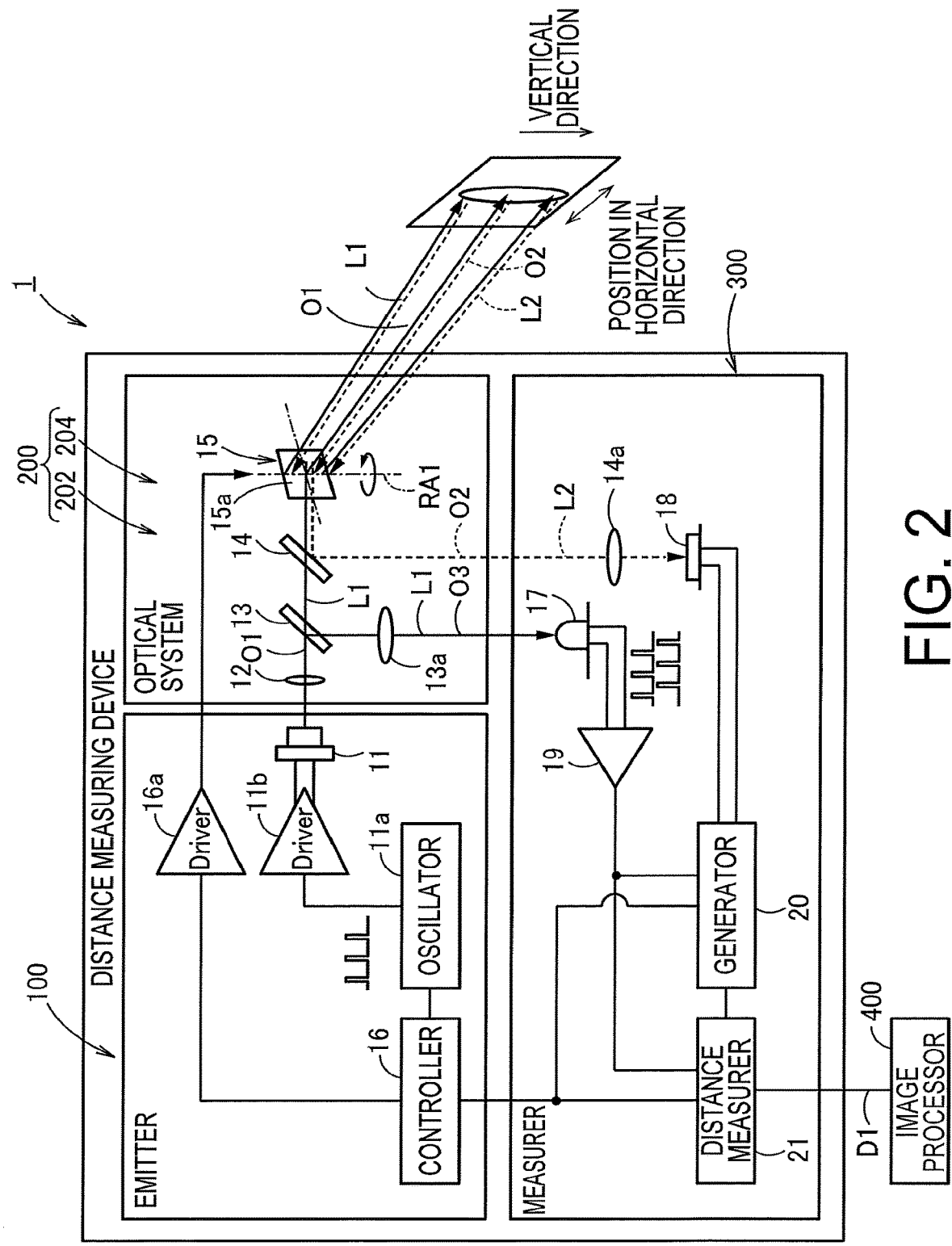
FIG. 2 is a diagram showing a configuration example of the distance measuring device according to the embodiment.

More detailed configuration examples of the emitter 100, the optical mechanism system 200, and the measurer 300 are explained with reference to FIG. 2. FIG. 2 is a diagram showing a configuration example of the distance measuring device 1 according to the embodiment.

As shown in FIG. 2, the distance measuring device 1 generates a distance image of the measurement target object 10 using the scanning scheme and the TOF (Time Of Flight) scheme. As explained above, the distance measuring device 1 includes the emitter 100, the optical mechanism system 200, the measurer 300, and the image processor 400.

The emitter 100 includes a light source 11, an oscillator 11a, a first driving circuit 11b, a controller 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 incudes a second optical element 14 and the mirror 15. That is, the irradiation optical system 202 and the light-receiving optical system 204 share the mirror 15.

The measurer 300 includes a lens 14a, a photodetector 17, a sensor 18, a first amplifier 19, a generator 20, and a distance measurer 21. Note that, as an existing method for scanning light, there is a method of rotating the distance measuring device 1 to scan light (hereinafter referred to as rotating method). For example, the emitter 100, an optical system 200, the lens 14a of the measurer 300, the photodetector 17, and the sensor 18 may be mounted on a rotation table and rotated. Consequently, it is possible to perform measurement in a 360-degree direction.

As shown in FIG. 2, the light source 11, the lens 12, the first optical element 13, the second optical element 14, and the mirror 15 are disposed in this order on an optical axis O1 of the irradiation optical system 202. The oscillator 11a of the emitter 100 generates a pulse signal on the basis of a control signal of the controller 16. The first driving circuit 11b drives the light source 11 on the basis of the pulse signal. The light source 11 is, for example, a surface emitting laser. The light source 11 intermittently emits the laser light L1 according to driving by the first driving circuit 11b. The laser light L1 has high directivity with respect to a traveling direction. Therefore, the laser light L1 travels while maintaining an irradiation range unless the width of light is changed by an optical member.

Figure 3:
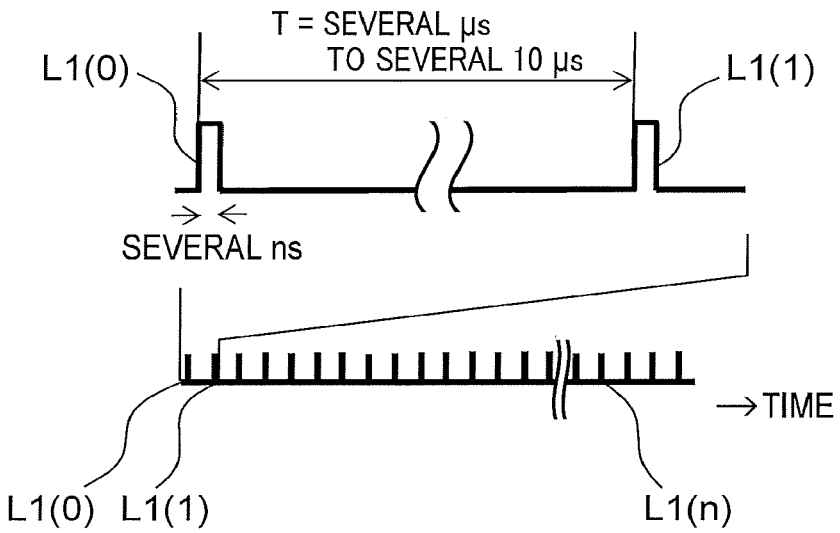
FIG. 3 is a diagram schematically showing a light emission pattern of a light source.

FIG. 3 is a diagram schematically showing a light emission pattern of the light source 11. In FIG. 3, the horizontal axis indicates time and the vertical axis indicates light emission timing of the light source 11. A figure on the lower side is a partially enlarged view in a figure on the upper side. As shown in FIG. 3, the light source 11 intermittently repeatedly emits laser light $L1(n)$ ($0 \leq n < N$), for example, at an interval of T=4 to 5 microseconds. The laser light L1 emitted n-th is represented as $L1(n)$. For example, N indicates the number of times of irradiation of the laser light L1 irradiated to generate one distance image.

As shown in FIG. 2, the lens 12 is, for example, a cylindrical lens. The lens 12 expands the laser light L1 in the vertical direction orthogonal to the optical axis O1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror.

The second driving circuit 16a drives the mirror 15 according to a driving signal supplied from the controller 16. Consequently, the mirror 15 changes an angle of an incident surface with respect to the laser light L1 at a rotation cycle F. The laser light L1 reflected on the mirror 15 travels along an optical axis O1a. The controller 16 controls the second driving circuit 16a and controls processing operation of the entire distance measuring device 1. The mirror 15 alternately repeats clockwise rotation and counterclockwise rotation. The rotation cycle F means a time difference between a point in time when the clockwise rotation is started and a point in time when the counterclockwise rotation ends.

Figure 4:
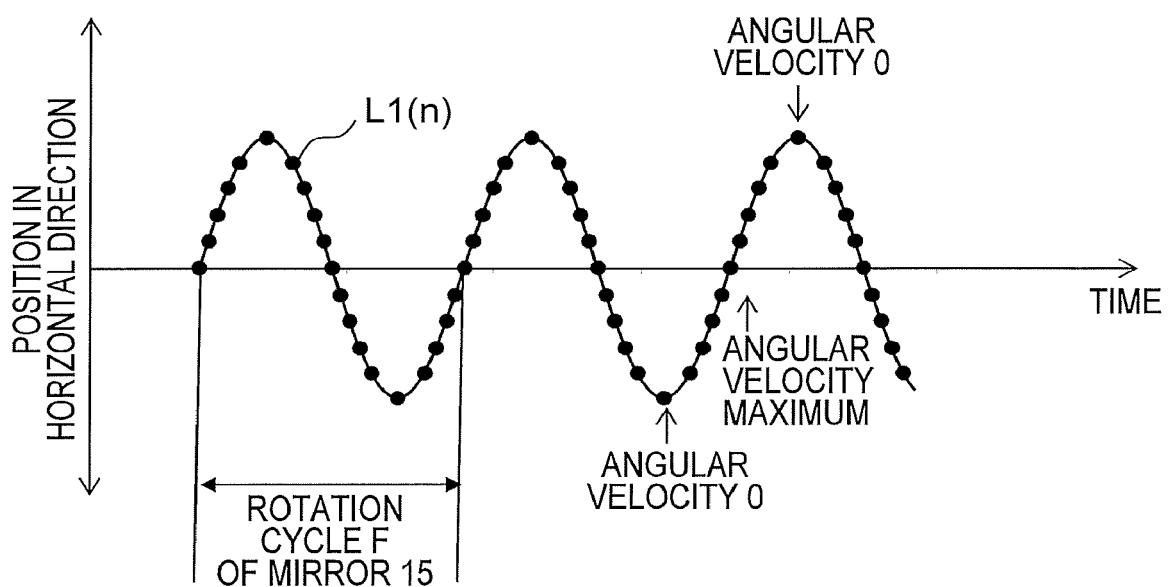
FIG. 4 is a diagram schematically showing a relation between a position in the horizontal direction of laser light L1 irradiated on a measurement target object and an irradiation time.

FIG. 4 is a diagram schematically showing positions in the horizontal direction of the laser light L1 irradiated on the measurement target object 10 via the mirror 15. Note that, in this specification, a rotation axis RA1 of the mirror 15 is disposed in a normal direction of a predetermined reference plane. The surface direction of the reference plane is set as the horizontal direction and the normal direction of the reference plane is set as the vertical direction. The vertical axis indicates a position in the horizontal direction on the measurement target object 10. The horizontal axis indicates time. As shown in FIG. 4, according to the rotation cycle F of the mirror 15, a position in the horizontal direction where the laser light $L1(n)$ ($0 \leq n < N$) is intermittently irradiated on the measurement target object 10 cyclically fluctuates. The angular velocity of the mirror 15 is 0 at a point in time when the counterclockwise rotation is switched to the clockwise rotation. Similarly, the angular velocity of the mirror 15 is 0 at a point in time when the clockwise rotation is switched to the counterclockwise rotation. On the other hand, the angular velocity is the maximum at an intermediate point in time between the points in time when the angular velocity is 0.

As shown in FIG. 2, a reflection surface 15a of the mirror 15, the second optical element 14, the lens 14a, and the sensor 18 are disposed on an optical axis O2 of the light-receiving optical system 204 in order of incidence of the reflected light L2.

The optical axis O1 is a focal axis of the lens 12 that passes the center position of the lens 12. The optical axis O2 is a focal axis of the lens 14a that passes the center position of the lens 14a.

The second optical element 14 changes a traveling direction of reflected light reflected on the reflection surface 15a and makes the reflected light incident on the lens 14a of the measurer 300 along the optical axis O2. The lens 14a condenses, on the sensor 18, the reflected light L2 made incident along the optical axis O2. On the other hand, light reflected in a direction different from the optical axis O2 is not made incident on the reflection surface 15a. Therefore, the light does not reach an incident surface of the sensor 18.

Figure 5:
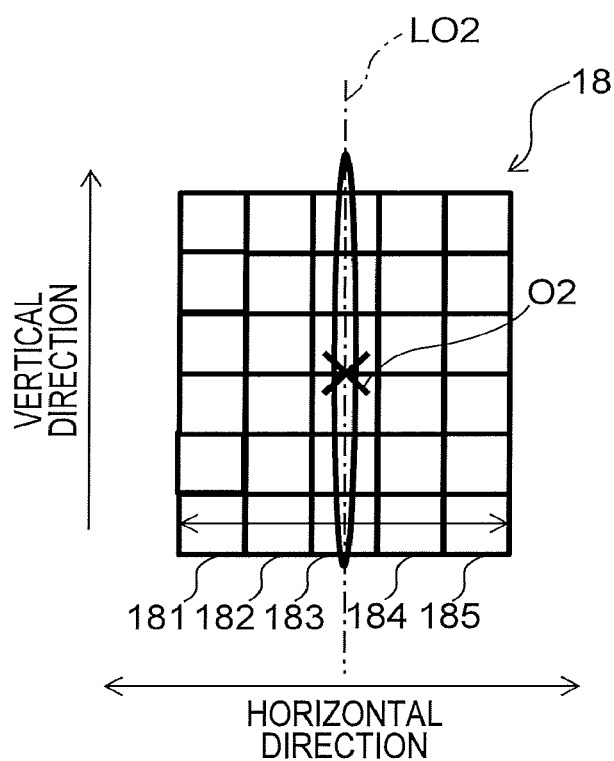
FIG. 5 is a diagram showing a configuration example of a sensor in which a plurality of light receiving elements are disposed in a matrix shape.

FIG. 5 is a diagram showing a configuration example of the sensor 18 in which a plurality of light receiving elements are disposed in a matrix shape. A position on the sensor of the reflected light L2 at the time when the angular velocity of the mirror 15 is 0, that is, the mirror 15 is stopped is schematically shown. As shown in FIG. 5, the optical axis O2 of the light-receiving optical system 204 crosses the center of the light receiving surface of the sensor 18. For example, in a light receiving element group 181, six light receiving elements 181 are disposed in a one-dimensional column in the vertical direction. That is, the sensor 18 is configured by light receiving element groups 181 to 185 in which light receiving elements are respectively disposed in one-dimensional columns in the vertical direction of the light receiving surface of the sensor 18. Further, the light receiving element groups 183 to 185 are disposed in positions away from the optical axis O2 in the order of the light receiving groups 183, 184, and 185. Similarly, the light receiving elements 181 to 183 are disposed in positions away from the optical axis O2 in the order of the light receiving element groups 183, 182, and 181. Note that, when single light receiving elements in the light receiving element groups 181 to 185 are explained in the following explanation, the light receiving elements are represented as the light receiving elements 181 to 185. For example, one light receiving element in the light receiving element group 181 is represented as the light receiving element 181.

A reference line LO2 is a center line of a light beam of the reflected light L2 traveling in the optical axis O2 direction. The reference line LO2 passes the center position in the horizontal direction of the light receiving surface of the sensor 18 if the angular velocity of the mirror 15 is 0. On the other hand, when the angular velocity of the mirror 15 is not 0, the reference line LO2 moves from the center position in the horizontal direction of the light receiving surface of the sensor 18 toward the light receiving element group 185 or from the center position in the horizontal direction of the light receiving surface of the sensor 18 toward the light receiving element group 181 according to an elapsed time from timing when the laser light L1 is emitted until the reflected light L2 reaches the mirror 15. That is, if a rotating direction of the mirror 15 is clockwise, the reference line LO2 moves from the light receiving element group 183 toward the light receiving element group 181 according to the elapsed time from the timing when the laser light L1 is emitted. On the other hand, if the rotating direction of the mirror 15 is counterclockwise, the reference line LO2 moves from the light receiving element group 183 toward the light receiving element group 185 according to the elapsed time from the timing when the laser light L1 is emitted. As it is seen from the above, if the light receiving elements mainly used for the detection of the reflected light L2 are extracted according to the elapsed time from the timing when the laser light L1 is emitted and the angular velocity of the mirror 15, it is possible to reduce the influence of environment light.

The lens 14a (FIG. 2) according to this embodiment condenses the reflected light L2 such that the width in the horizontal direction of the reflected light L2 is narrower than the width of an opening of the light receiving element. Therefore, the reflected light L2 is not simultaneously made incident on three light receiving elements continuously disposed in the horizontal direction. For example, the reflected light L2 is not simultaneously made incident on the light receiving element groups 181, 183, and 185. Similarly, the reflected light L2 is not simultaneously made incident on the light receiving element groups 182 and 184.

As shown in FIG. 2, the generator 20 generates time-series signals for measurement in a period T from light emission start timing of the laser light L1 until the next light emission start timing of the laser light L1. The generator 20 generates a signal for measurement for each of the light receiving elements 181 to 185 disposed in a one-dimensional column in the horizontal direction in the light receiving element groups 181 to 185. For example, in the sensor 18 shown in FIG. 5, six light receiving elements are disposed in a one-dimensional column in the vertical direction. Therefore, six signals for measurement are generated by the generator 20.

As shown in FIG. 2, the distance measurer 21 measures, using an output signal of the first amplifier 19, the distance to the measurement target object 10 on the basis of a time difference between light emission timing of the laser light L1 and timing of a peak position of a signal value of each of the time-series signals for measurement generated by the generator 20. That is, the distance measurer 21 measures distances at six points in the vertical direction of the measurement target object 10. Note that the number of measurement points in the vertical direction according to this embodiment is six. However, the number of measurement points is not limited to this.

Figure 6:
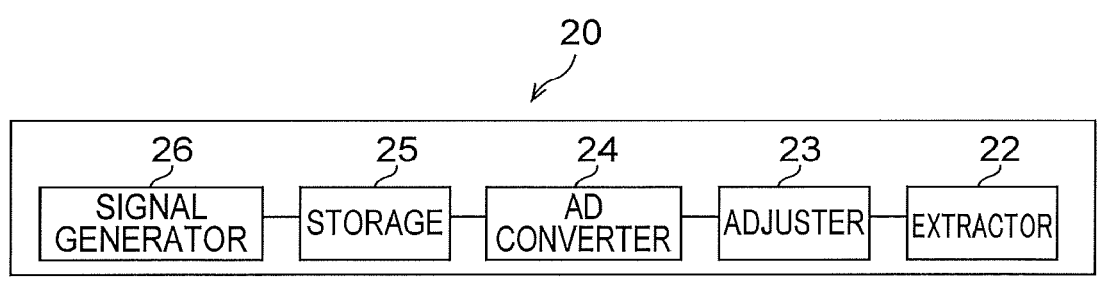
FIG. 6 is a block diagram showing a detailed configuration of a generator.

A detailed configuration of the generator 20 is explained with reference to FIG. 6. FIG. 6 is a block diagram showing the detailed configuration of the generator 20. As shown in FIG. 6, the generator 20 includes an extractor 22, an adjuster 23, an AD converter 24, a storage 25, and a signal generator 26. Each of the extractor 22, the adjuster 23, and the signal generator 26 is realized by a hardware configuration. For example, each of the extractor 22, the adjuster 23, and the signal generator 26 is constituted by a circuit.

The extractor 22 extracts light receiving elements used for measurement of the distance to the measurement target object 10 among the light receiving elements in the light receiving element groups 181 to 185 (FIG. 5) of the sensor 18. For example, the extractor 22 extracts light receiving elements corresponding to positions on the light receiving surface of the sensor 18 on which the reflected light L2 reflected by the mirror 15 should be made incident. More specifically, the extractor 22 extracts a light receiving element group used for the measurement of the distance to the measurement target object 10 out of the light receiving element groups 181 to 185 (FIG. 5) according to an elapsed time from the light emission timing of the laser light L1 and the angular velocity of the mirror 15. That is, the extractor 22 extracts a light receiving element group in positions further away from the optical axis center O2 of the light-receiving optical system 204 as the elapsed time from the light emission timing of the laser light L1 increases. The extractor 22 sets positions of a light receiving element group extracted when a predetermined time elapses from the light emission timing of the laser light L1 to a position further away from the optical axis center O2 of the light-receiving optical system 204 as the angular velocity of the mirror 15 increases.

The adjuster 23 adjusts, according to an amplification factor corresponding to the light receiving elements extracted by the extractor 22, signal values of electric signals of the light receiving elements. For example, the adjuster 23 adjusts the magnitudes of respective electric signals of the light receiving element group extracted by the extractor 22 out of the light receiving element groups 181 to 185 (FIG. 5) and outputs the electric signals to the AD converter 24. More specifically, the adjuster 23 sets the amplification factor of the light receiving elements extracted by the extractor 22 higher than an amplification factor of the other light receiving elements among the light receiving elements included in the sensor 18.

The AD converter 24 samples, on the basis of the electric signals output by the adjuster 23, at a predetermined sampling interval, respective electric signals input from the light receiving elements in the light receiving element groups 181 to 185 (FIG. 5) included in the sensor 18. Detailed configurations of the adjuster 23 and the AD converter 24 are explained below.

The storage 25 stores, in time series, digital signals converted by the AD converter 24. The storage is realized by, for example, a semiconductor memory element such as a RAM (Random Access Memory) or a flash memory, a hard disk, or an optical disk.

The signal generator 26 adds up, for each of the light receiving elements disposed in a one-dimensional column in the horizontal direction, digital signals based on output signals of the respective light receiving element groups 181 to 185 (FIG. 5) stored in the storage 25 and generates a time-series signal for measurement. Consequently, a measurement signal is generated for each of the light receiving elements 181 to 185 disposed in a one-dimensional column in the horizontal direction.

Figure 7:
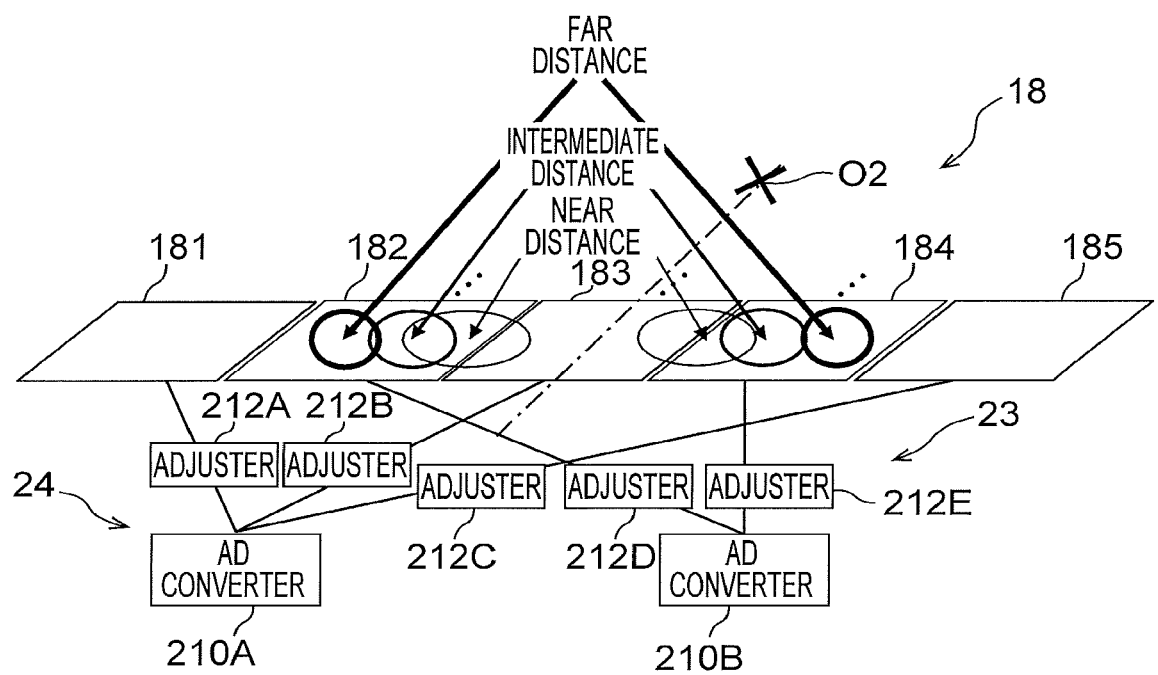
FIG. 7 is a diagram showing a relation between the plurality of light receiving elements disposed in a one-dimensional column in the horizontal direction and an adjuster.

More detailed configurations of the adjuster 23 and the AD converter 24 are explained with reference to FIG. 7. FIG. 7 is a diagram showing a relation between the light receiving element groups 181 to 185 and adjuster groups 212A to 212E of the adjuster 23. A part of a light beam of the reflected light L2 on the light receiving surface of the sensor 18 is schematically shown to correspond to the distance to the measurement target object 10. That is, as the distance to the measurement target object 10 increases, an incident position of the reflected light L2 moves to a position further away from the optical axis center of the light-receiving optical system 204.

As shown in FIG. 7, the adjuster 23 includes the adjuster groups 212A to 212E respectively connected to the light receiving element groups 181 to 185 disposed in a one-dimensional column in the vertical direction. For example, the respective light receiving elements 181 in the light receiving element group 181 are connected to corresponding respective adjusters 212A in the adjuster group 212A. Consequently, the respective adjusters 212A in the adjuster group 212A are capable of adjusting the magnitudes of output signals of the respective light receiving elements 181 in the light receiving element group 181.

Similarly, the respective light receiving elements 182 in the light receiving element group 182 are connected to corresponding respective adjusters 212D in the corresponding adjuster group 212D. The respective light receiving elements 183 in the light receiving element group 183 are connected to corresponding respective adjusters 212B in the corresponding adjuster group 212B. The respective light receiving elements 184 in the light receiving element group 184 are connected to the corresponding respective adjusters 212E in the corresponding adjuster group 212E. The respective light receiving elements 185 in the light receiving element group 185 are connected to corresponding respective adjusters 212C in the corresponding adjuster group 212C. Consequently, for example, the adjuster 23 changes an amplification factor of the adjuster groups 212A to 212E according to the light receiving element group extracted by the extractor 22 out of the light receiving element groups 181 to 185 and adjusts the magnitudes of the respective electric signals output by the plurality of light receiving elements of the sensor 18. When the amplification ratio of the adjusters in the adjuster groups 212A to 212E is set to 0, electric signals of the light receiving elements connected to the adjusters are not output to the AD converter 24.

As shown in FIG. 7, the adjuster 212A is connected to the light receiving element 181, the adjuster 212B is connected to the light receiving element 183, and the adjuster 212C is connected to the light receiving element 185 among the light receiving elements 181 to 185 disposed in a one-dimensional column in the horizontal direction. An AD converter 210A is connected to the adjuster 212A, the adjuster 212B, and the adjuster 212C. Similarly, the adjuster 212D is connected to the light receiving element 182 and the adjuster 212E is connected to the light receiving element 184 among the light receiving elements 181 to 185 disposed in a one-dimensional column in the horizontal direction. An AD converter 210B is connected to the adjuster 212D and the adjuster 212E.

That is, the AD converter group 210A included in the AD converter 24 is connected to the light receiving element groups 181, 183, and 185 via the adjuster groups 212A to 212C. Similarly, the AD converter group 210B is connected to the light receiving element groups 182 and 184 via the adjuster groups 212D and 212E.

With such a connection, the adjuster groups 212A to 212C are capable of switching an input to the AD converter group 210A to any one light receiving element group among the light receiving element groups 181, 183, and 185 or weighting outputs of the light receiving element groups 181, 183, and 185. Similarly, the adjuster groups 212D and 212E are capable of switching an input to the AD converter group 210B to any one light receiving element group of the light receiving element groups 182 and 184 or weighting outputs of the light receiving element groups 182 and 184.

As shown in FIG. 5, the width in the horizontal direction of the reflected light L2 is smaller than the range of the opening of the light receiving element. Therefore, the reflected light L2 is not simultaneously made incident on three light receiving elements continuously disposed in the horizontal direction. Therefore, even if the AD converter group 210A is connected to the light receiving element groups 181, 183 and 185, the reflected light L2 is not simultaneously made incident on the respective light receiving element groups 181, 183, and 185. Therefore, an amplification factor of an adjuster group corresponding to a light receiving element group that receives the reflected light L2 among the light receiving element groups 181, 183, and 185 may be increased and an amplification factor of the other adjuster groups may be set to 0. Consequently, it is possible to prevent environment light or the like from being converted into an electric signal by the light receiving element group that does not receive the reflected light L2 among the light receiving element groups 181, 183, and 185. Similarly, an amplification factor of an adjuster group corresponding to a light receiving element group that receives the reflected light L2 of the light receiving element groups 182 and 184 may be increased and an amplification factor of the other adjuster groups may be set to 0. Consequently, it is possible to prevent environment light or the like from being converted into an electric signal by the light receiving element group that does not receive the reflected light L2 of the light receiving element groups 182 and 184.

Figure 8:
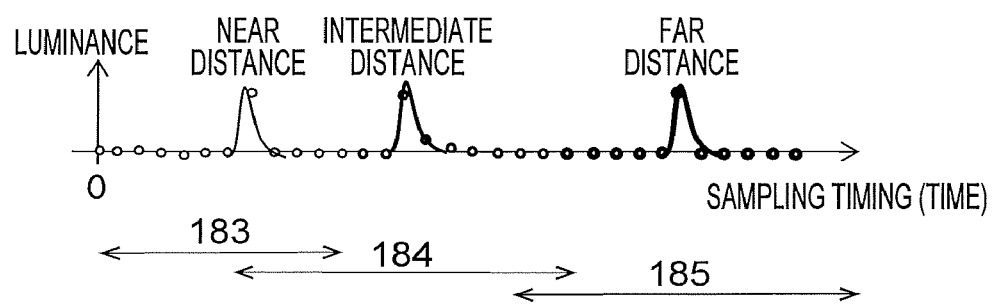
FIG. 8 is a diagram showing an example of sampling values by an AD converter of an electric signal based on reflected light.

FIG. 8 is a diagram showing an example of sampling values by the AD converter 24 of an electric signal based on the reflected light L2. The horizontal axis of FIG. 8 indicates sampling timing by the AD converter 24 and the vertical axis indicates a signal value (luminance) of a digital signal obtained by sampling. 0 of the origin indicates timing when the photodetector 17 detects the laser light L1.

In FIG. 8, signal values of time-series signals for measurement obtained by measuring the measurement target object 10 present at a near distance from the distance measuring device 1, signal values of time-series signals for measurement obtained by measuring the measurement target object 10 present at an intermediate distance from the distance measuring device 1, and signal values of time-series signals for measurement obtained by measuring the measurement target object 10 present at a far distance from the distance measuring device 1 are superimposed and displayed. Positions of peaks of the signal values indicate timings when the reflected light L2 returns from the measurement target object 10. An arrow on the lower side indicates output signals mainly used for measurement among output signals of the light receiving element groups 181 to 185.

As shown in FIG. 8, as the distance from the distance measuring device 1 to the measurement target object 10 increases, a time difference between timing of light emission of the laser light L1 and timing of a position of a peak of signal values of time-series digital signals increases. That is, the distance is calculated by an expression: the distance=light speed×(the timing of the peak position of the signal value−timing when the photodetector 17 detects the laser light L1)/2. Light receiving element groups mainly used for measurement are changed in the order of light receiving element groups 183, 184, and 185 according to sampling timing, that is, a measurement distance between the distance measuring device 1 and the measurement target object 10.

A relation between a measurement distance and a combination of the light receiving elements is explained with reference to FIG. 9 in view of FIGS. 7 and 8. FIG. 9 is a diagram in which a relation between a measurement distance and a combination of the light receiving elements is summarized for each angular velocity of the mirror 15.

For example, when the distance between the distance measuring device 1 and the measurement target object 10 is, for example, 50 meters, a round-trip time of light is 0.33 microsecond. Since an oscillation frequency of the mirror 15 is, for example, 2000 hertz, the mirror 15 rotates a maximum angle of 0.25 degree in 0.33 microsecond. In other words, when the measurement target object 10 in a position 50 meters away is measured, the mirror 15 rotates the maximum angle of 0.25 degree from the timing when the laser light L1 is emitted until the reflected light L2 reaches the mirror 15.

In this way, when the oscillation frequency of the mirror 15 is decided, the angular velocity of the mirror 15 can be determined by a mirror angle and an oscillation frequency at the timing when the laser light L1 is emitted. It is also conceivable to measure angular velocity from a displacement sensor of the mirror. It is also possible to determine, on the basis of the distance between the distance measuring device 1 and the measurement target object 10, a time from the timing when the laser light L1 is emitted until the reflected light L2 reaches the mirror 15. Therefore, it is possible to calculate, according to an elapsed time from timing when the irradiation of the laser light L1 is started, in which position on the sensor 18 the reflected light L2 is received.

A measurement limit time of the distance measuring device 1 corresponds to an irradiation interval T (FIG. 3) of the laser light L1. That is, the measurement limit time corresponds to a time period T from the timing when the emission of the laser light L1 is started until the next emission of the laser light L1 is started.

For example, when the angular velocity is small, even if the time period T elapses, a rotation angle of the mirror 15 does not increase enough for changing the light receiving position on the sensor 18 of the reflected light L2 from the light receiving element 183. Therefore, it is possible to use the light receiving element 183 in the entire measurement range.

On the other hand, when the angular velocity is large, a rotation angle of the mirror 15 at timing when the time period T elapses changes the light receiving position on the sensor 18 of the reflected light L2 to the light receiving element 181 or 185. Therefore, according to an elapsed time from the time when the irradiation of the laser light L1 is started, the light receiving position on the sensor 18 of the reflected light L2 is changed in order from the light receiving element 183 to the light receiving element 185 or from the light receiving element 183 to the light receiving element 181. That is, when the mirror 15 rotates counterclockwise (+), the light receiving element 183 to the light receiving element 185 are used in order. When the mirror 15 rotates clockwise (−), the light receiving element 183 to the light receiving element 181 are used in order.

A relation of connection between the light receiving elements and the AD converters is explained with reference to FIG. 10 in view of FIG. 7. FIG. 10 is a diagram in which a relation of connection between the light receiving elements and the AD converters is summarized for each angular velocity of the mirror 15. When the angular velocity is small, even if the time period T elapses, the rotation angle of the mirror 15 does not increase enough for changing the light receiving position on the sensor 18 of the reflected light L2 from the light receiving element 183. Therefore, outputs of the adjusters 212A, 212B, and 212C are adjusted such that an electric signal from the light receiving element 183 is mainly input to the AD converter 210A.

On the other hand, when the angular velocity is large, the rotation angle of the mirror 15 at the timing when the time period T elapses changes the light receiving position on the sensor 18 of the reflected light L2 to the light receiving element 181 or 185. Therefore, according to the elapsed time from the timing when the irradiation of the laser light L1 is started, the outputs of the adjusters 212A, 212B, and 212C are adjusted such that an input to the AD converter 210A is changed from an output from the light receiving element 183 to an output from the light receiving element 181 or from the output from the light receiving element 183 to an output from the light receiving element 185. Similarly, the outputs of the adjusters 212D and 212E are adjusted such that an input to the AD converter 210B is changed to an output from the light receiving element 182 or 184.

Figure 11A:
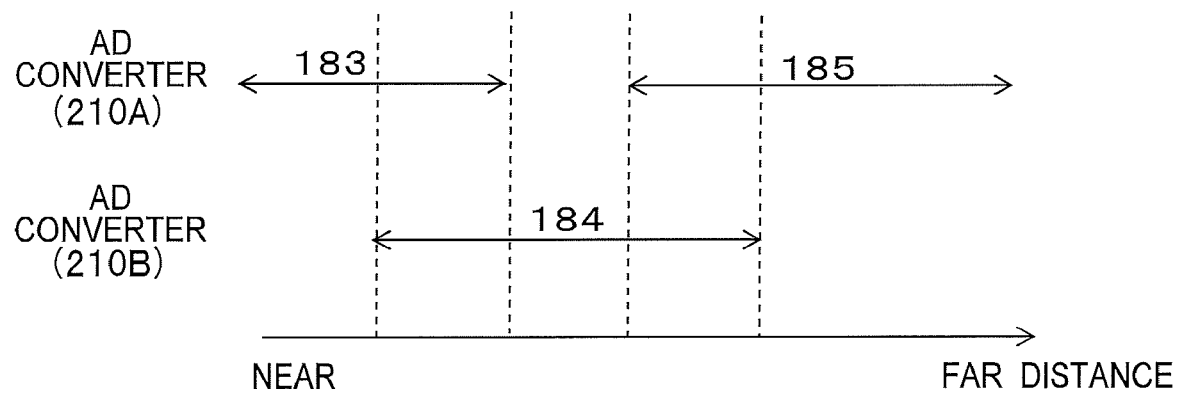
FIG. 11A is a diagram showing the light receiving elements that mainly perform input to the AD converters when the mirror rotates counterclockwise at high angular velocity.

FIG. 11A is a diagram showing the light receiving elements that mainly perform input to the AD converter 210B when the mirror 15 rotates counterclockwise (+) at high angular velocity. The horizontal axis indicates the distance to the measurement target object 10 and corresponds to an elapsed time. As shown in FIG. 11A, when the measurement target object 10 is at a near distance, an output of the light receiving element 183 is converted into a digital signal mainly by the AD converter 210A. When the distance to the measurement target object 10 increases, the output of the light receiving element 183 is converted into a digital signal mainly by the AD converter 210A. An output of the light receiving element 184 is converted into a digital signal mainly by the AD converter 210B.

When the distance to the measurement target object 10 further increases, the output of the light receiving element 184 is converted into a digital signal mainly by the AD converter 210B. When the distance to the measurement target object 10 further increases, the output of the light receiving element 184 is converted into a digital signal mainly by the AD converter 210A and an output of the light receiving element 185 is converted into a digital signal mainly by the AD converter 210B. When the distance to the measurement target object 10 further increases, the output of the light receiving element 185 is converted into the digital signal mainly by the AD converter 210B.

Figure 11B:
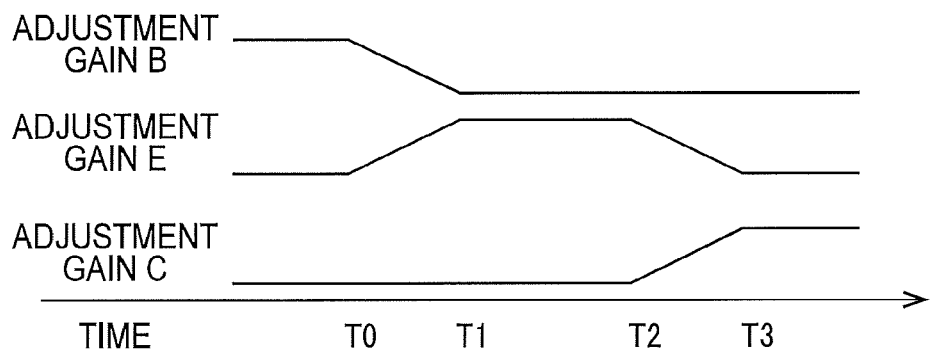
FIG. 11B is a diagram showing an adjustment example of gains at the time when the mirror rotates counterclockwise at intermediate angular velocity.

FIG. 11B is a diagram showing an adjustment example of gains of the light receiving elements 183,184, and 185 (FIG. 7) at the time when the mirror 15 rotates counterclockwise (+) at intermediate angular velocity. The horizontal axis indicates an elapsed time and corresponds to the distance to the measurement target object 10. As shown in FIG. 7, the adjuster 212B corresponds to the light receiving element 183, the adjuster 212E corresponds to the light receiving element 184, and the adjuster 212C corresponds to the light receiving element 185. An adjustment gain B corresponds to a gain of the adjuster 212B, an adjustment gain E corresponds to a gain of the adjuster 212E, and an adjustment gain C corresponds to a gain of the adjuster 212C.

As shown in FIG. 11B, the adjustment gain B corresponding to the light receiving element 183 decreases as time elapses and reaches a fixed value when T1 elapses. The adjustment gain E corresponding to the light receiving element 184 increases as time elapses and, when T2 elapses, decreases as time elapses. When T2 elapses, the adjustment gain C corresponding to the light receiving element 185 increases as time elapses.

As it is seen from the above, an electric signal mainly used is changed according to the position of the light receiving element on the basis of the angular velocity of the mirror 15 and the elapsed time from the timing when the light emission of the laser light L1 is started. Therefore, an electric signal based on light not corresponding to the reflected light L2 is prevented from being used for measurement. It is possible to reduce noise. In other words, it is possible to reduce noise by mainly using, for the measurement, an electric signal output by the light receiving element corresponding to the position on the light receiving surface of the sensor 18 on which the reflected light L2 reflected by the mirror 15 should be made incident.

Figure 12:
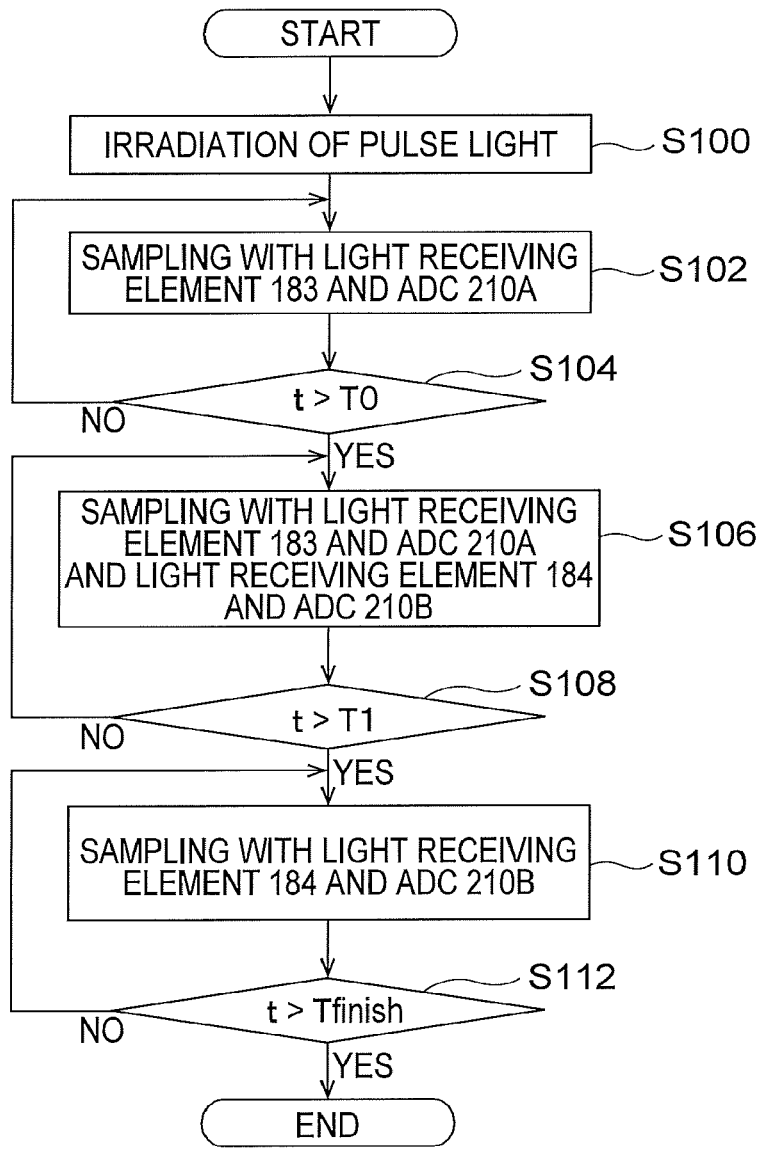
FIG. 12 is a flowchart for explaining a flow of a change of output signals of light receiving elements mainly used according to an elapsed time.

FIG. 12 is a flowchart for explaining a flow of a change of output signals of the light receiving elements mainly used according to an elapsed time when the mirror 15 rotates counterclockwise (+) at intermediate angular velocity. First, the light source 11 irradiates the laser light L1 according to the control by the controller 16 (step 100).

Subsequently, the extractor 22 extracts the light receiving element 183. The adjuster 23 adjusts an amplification factor of the adjustor groups 212A, 212B, and 212C such that an output of the light receiving element group 183 is input mainly to the AD converter group 210A (step 102). The AD converter group 210A converts electric signals respectively into digital signals and causes the storage 25 to store the digital signals in time series.

Subsequently, the extractor 22 determines whether the time period T from the start of the light emission of the laser light L1 exceeds T0 (step 104). If the time period T does not exceed T0 (NO in step 104), the extractor 22 repeats the processing from step 102.

On the other hand, if the time period T exceeds T0 (YES in step 104), the extractor 22 extracts the light receiving element groups 183 and 184. The adjuster 23 adjusts an amplification factor of the adjuster groups 212D and 212E such that an input to the AD converter group 210B is changed to mainly an output from the light receiving element group 184 in a state in which an output of the light receiving element group 183 is input mainly to the AD converter group 210A (step 106). The AD converter group 210A respectively converts electric signals into digital signals and causes the storage 25 to store the digital signals in time series. Similarly, the AD converter group 210B converts electric signals into digital signals and causes the storage 25 to store the digital signals in time series.

Subsequently, the extractor 22 determines whether the time period T from the start of the irradiation of the laser light L1 exceeds T1 (step 108). If the time period T does not exceed T1 (NO in step 108), the extractor 22 repeats the processing from step 106.

On the other hand, if the time period T exceeds T1 (YES in step 108), the extractor 22 extracts the light receiving element group 184. The adjuster 23 adjusts outputs of the adjuster groups 212D and 212E such that the input to the AD converter group 210B is changed to an output from the light receiving element group 184 (step 110). The AD converter group 210B respectively converts electric signals into digital signals and causes the storage 25 to store the digital signals in time series.

Subsequently, the controller 16 determines whether the time period T from the start of the irradiation of the laser light L1 exceeds Tfinish (step 112). If the time period T does not exceed Tfinish (NO in step 112), the controller 16 repeats the processing from step 110. On the other hand, if the time period T exceeds Tfinish (YES in step 112), the controller 16 ends the processing for one light emission of the laser light L1.

The signal generator 26 adds up, for each one-dimensional column, digital signals respectively generated by the AD converter groups 210A and 210B and generates a plurality of time-series signals for measurement. As explained above, the extractor 22 extracts, according to the elapsed time from the light emission timing of the laser light L1 and the angular velocity of the mirror 15, light receiving elements used for measurement. The adjuster 23 adjusts an amplification factor of the adjuster groups 212A to 212E such that output signals of the light receiving elements extracted by the extractor 22 are input mainly to the AD converter groups 210A and 210B.

As explained above, according to the embodiment, the extractor 22 extracts light receiving elements used for measurement of the distance to the measurement target object 10 out of the light receiving element groups 181 to 185. The adjuster 23 adjusts signal values of electric signals of the light receiving elements at an amplification factor corresponding to the extracted light receiving elements. Consequently, it is possible to generate time-series signals for measurement including, as main components, output signals of the light receiving elements corresponding to positions on the light receiving surface of the sensor 18 on which the reflected light L2 reflected by the mirror 15 should be made incident. It is possible to reduce the influence of environment light. Therefore, it is possible to reduce the influence of environment light even if the rotating speed of the mirror 15 is increased. It is possible to stably perform distance measurement.

Modification 1

In the embodiment, as shown in FIG. 4, the controller 16 controls the oscillator 11a such that the light emission of the laser light L1 is started from the rotation start timing of the mirror 15. On the other hand, in a modification 1, the controller 16 controls the oscillator 11a such that the start timing of the light emission of the laser light L1 shifts at each cycle from the rotation start timing of the mirror 15. This difference is explained below.

Figure 13:
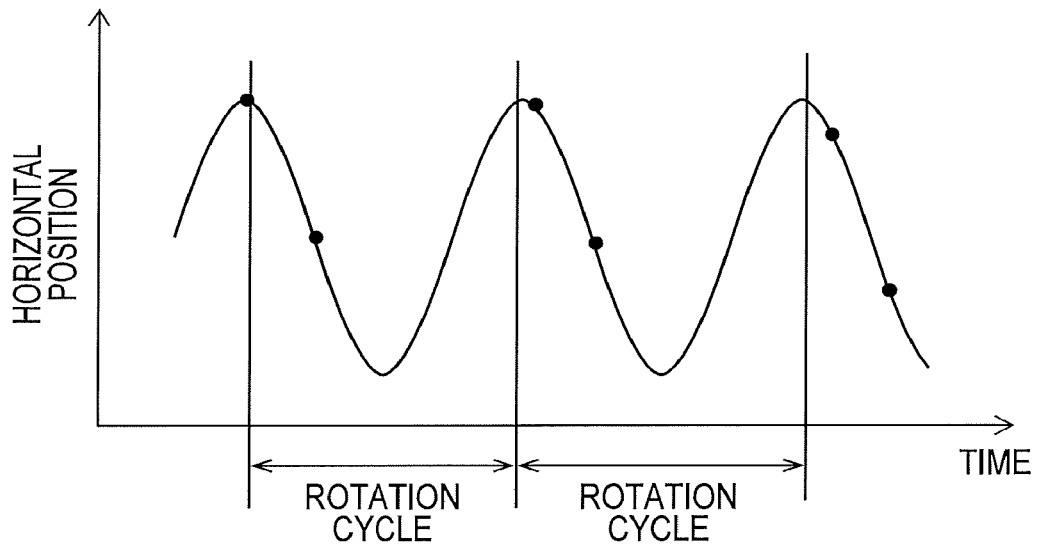
FIG. 13 is a diagram schematically showing a position in the horizontal direction of laser light gradually shifted at every rotation cycle of the mirror.

FIG. 13 is a diagram showing measurement points of measurement at the time when the oscillator 11a is controlled such that the start timing of the light emission of the laser light L1 shifts at each cycle from the rotation start timing of the mirror 15. As shown in FIG. 13, a position in the horizontal direction of the laser light L1 irradiated on the measurement target object 10 gradually shifts at every rotation cycle of the mirror 15. Since the positions of the measurement points shift in this way, the number of measurement points in a distance image increases. It is possible to increase the resolution of a distance image generated by the image processor 400.

Figure 14:
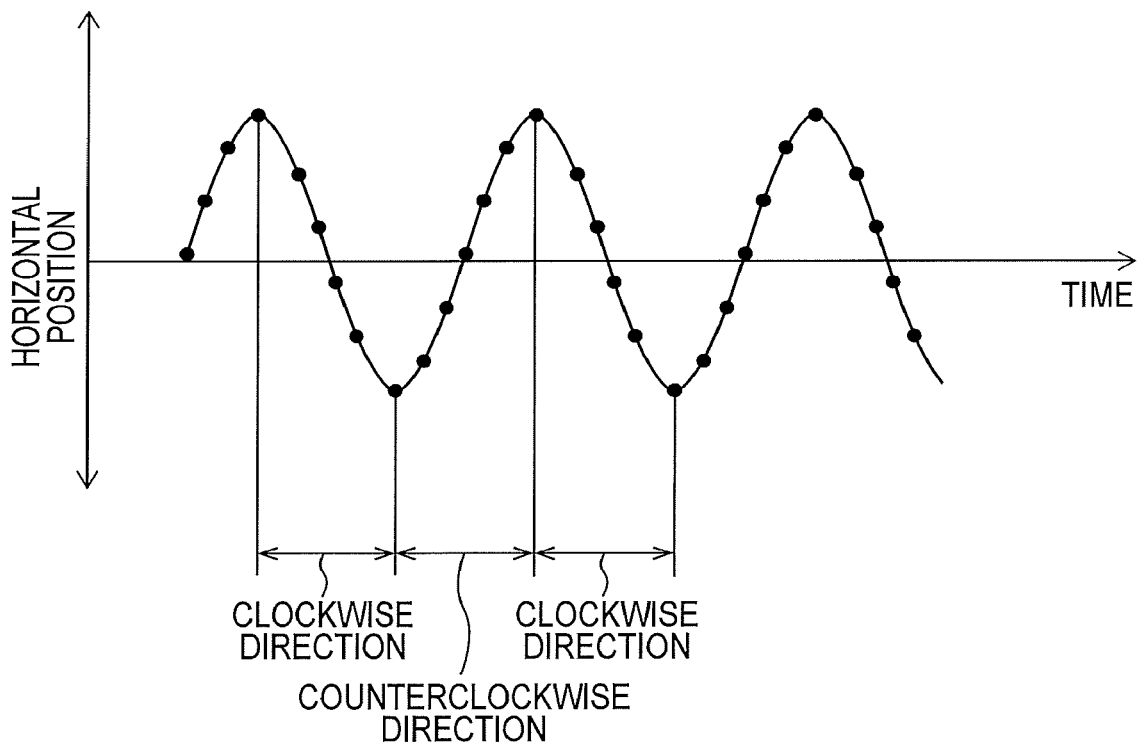
FIG. 14 is a diagram schematically showing a position in the horizontal direction of the laser light shifted according to a rotating direction of the mirror.

FIG. 14 is a diagram schematically showing a position in the horizontal direction of the laser light L1, which irradiated on the measurement target object 10, shifted according to a rotating direction of the mirror 15. The vertical axis indicates a position in the horizontal direction on the measurement target object 10 and the horizontal axis indicates time. As shown in FIG. 13, the controller 16 performs control for shifting, by T/2 (FIG. 3), light emission timing of the light source 11 with respect to a rotation angle of the mirror 15 rotating in one direction and light emission timing of the light source 11 with respect to a rotation angle of the mirror 15 rotating in the other direction. Consequently, a measurement point in scan 2 is disposed at an intermediate point between measurement points in scan 1. In this way, since the measurement point in the scan 2 is disposed at the intermediate point between the measurement points in the scan 1, it is possible to efficiently increase the resolution of the distance image.

Modification 2

In the embodiment, after the magnitudes of the electric signals output from the plurality of light receiving elements are changed, the electric signals are AD-converted. On the other hand, in a modification 2, after the electric signals output from the plurality of light receiving elements are AD-converted, the magnitudes of the electric signals are changed. This difference is explained below.

Figure 15:
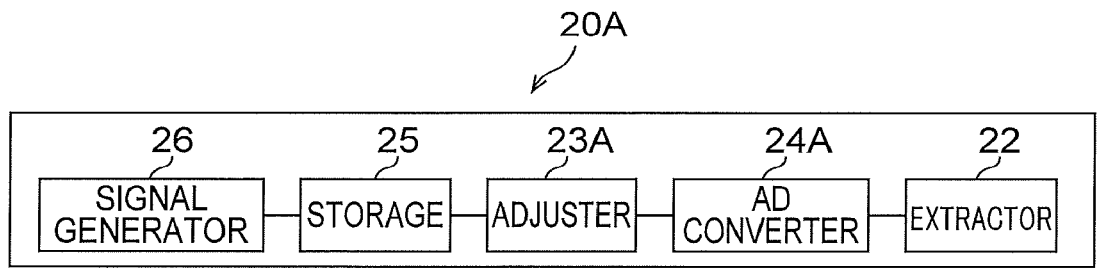
FIG. 15 is a block diagram showing a detailed configuration of a generator according to a modification 2.

FIG. 15 is a block diagram showing a detailed configuration of a generator 20A according to the modification 2. As shown in FIG. 15, the generator 20A according to the modification 2 includes the extractor 22, an adjuster 23A, an AD converter 24A, the storage 25, and the signal generator 26. The components equivalent to the components in the embodiment are denoted by the same reference numerals and signs. Explanation of the components is omitted.

The AD converter 24A samples, at a predetermined sampling interval, respective electric signals input from the light receiving elements in the light receiving element groups 181 to 185 (FIG. 5) included in the sensor 18 and generates a signal for measurement.

The adjuster 23A adjusts, at an amplification factor corresponding to the light receiving elements extracted by the extractor 22, the magnitude of the signal for measurement generated by the AD converter 24A. More specifically, the adjuster 23 further increases an amplification factor of AD converters corresponding to the light receiving elements extracted by the extractor 22.

Figure 16:
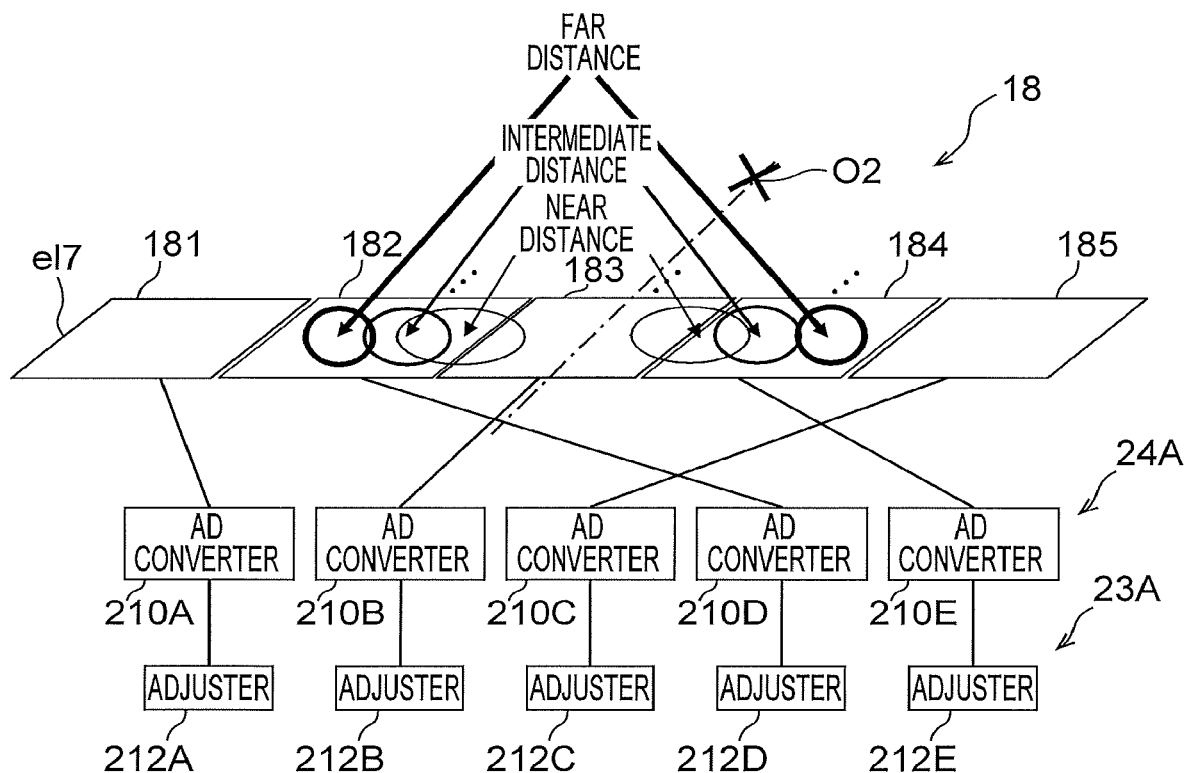
FIG. 16 is a diagram showing a relation between a plurality of light receiving elements disposed in a one-dimensional column and adjusters according to the modification 2.

FIG. 16 is a diagram showing a relation among the light receiving element groups 181 to 185, AD converters 210A to 210E of the AD converter 24A, and the adjuster groups 212A to 212E of the adjuster 23. A part of a light beam of the reflected light L2 on the light receiving surface of the sensor 18 is schematically shown to correspond to the distance to the measurement target object 10. That is, as the distance to the measurement target object 10 increases, an incident position of the reflected light L2 moves to a position further away from the optical axis center of the light-receiving optical system 204.

As shown in FIG. 16, the AD converter 24A includes the AD converter groups 210A to 210E respectively connected to the light receiving element groups 181 to 185 disposed in a one-dimensional column in the vertical direction. The adjuster 23A includes the adjuster groups 212A to 212E respectively connected to the AD converter groups 210A to 210E disposed in a one-dimensional column in the vertical direction. For example, the respective AD converters 210A in the AD converter group 210A are connected to the corresponding respective adjusters 212A in the adjuster group 212A. Consequently, the respective adjusters 212A in the adjuster group 212A are capable of adjusting the magnitudes of output signals of the corresponding respective AD converters in the AD converter group 210A.

Figure 17:
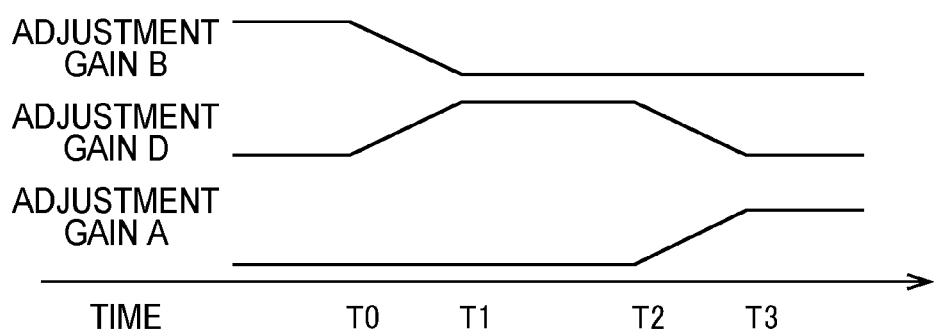
FIG. 17 is a diagram showing an adjustment example of gains at the time when the mirror rotates clockwise at the intermediate angular velocity.

FIG. 17 is a diagram showing an adjustment example of gains of the light receiving elements 181, 182, and 183 (FIG. 7) at the time when the mirror 15 rotates clockwise (−) at the intermediate angular velocity. The horizontal axis indicates an elapsed time and corresponds to the distance to the measurement target object 10. As shown in FIG. 7, the adjuster 212A corresponds to the light receiving element 181, the adjuster 212D corresponds to the light receiving element 182, and the adjuster 212B corresponds to the light receiving element 183. The adjustment gain B corresponds to a gain of the adjuster 212B, the adjustment gain D corresponds to a gain of the adjuster 212D, and the adjustment gain A corresponds to a gain of the adjuster 212A.

As shown in FIG. 17, the adjustment gain B corresponding to the light receiving element 182 decreases as time elapses and reaches a fixed value when T1 elapses. The adjustment gain D corresponding to the light receiving element 182 increases as time elapses and, when T2 elapses, gradually decreases as time elapses. When T2 elapses, the adjustment gain A corresponding to the light receiving element 181 increases as time elapses.

As it is seen from the above, the signal for measurement mainly used is changed according to the positions of the light receiving elements on the basis of the angular velocity of the mirror 15 and the elapsed time from the timing when the light emission of the laser light L1 is started. Therefore, a signal for measurement based on light not corresponding to the reflected light L2 is prevented from being used for measurement. It is possible to reduce noise. In other words, it is possible to reduce noise by mainly using, for the measurement, a signal for measurement output by the light receiving element corresponding to the position on the light receiving surface of the sensor 18 on which the reflected light L2 reflected by the mirror 15 should be made incident.

Modification 3

A modification 3 is different from the modification 2 in that, after electric signals output from the plurality of light receiving elements are AD-converted, a signal for measurement is stored in the storage. The difference is explained below.

Figure 18:
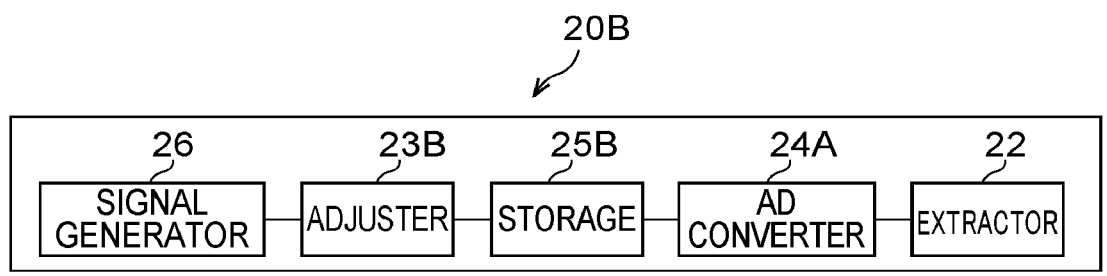
FIG. 18 is a block diagram showing a detailed configuration of a generator according to a modification 3.

FIG. 18 is a block diagram showing a detailed configuration of a generator 20B according to the modification 3. As shown in FIG. 18, the generator 20B according to the modification 3 includes the extractor 22, an adjuster 23B, the AD converter 24A, a storage 25B, and the signal generator 26. Components equivalent to the components in the modification 2 are denoted by the same reference numerals and signs. Explanation of the components is omitted.

The storage 25B stores a signal for measurement generated by the AD converter 24A. The adjuster 23B adjusts, according to an amplification factor corresponding to light receiving elements extracted by the extractor 22, the magnitude of the signal for measurement generated by the AD converter 24A and stored in the storage 25B.

Figure 19:
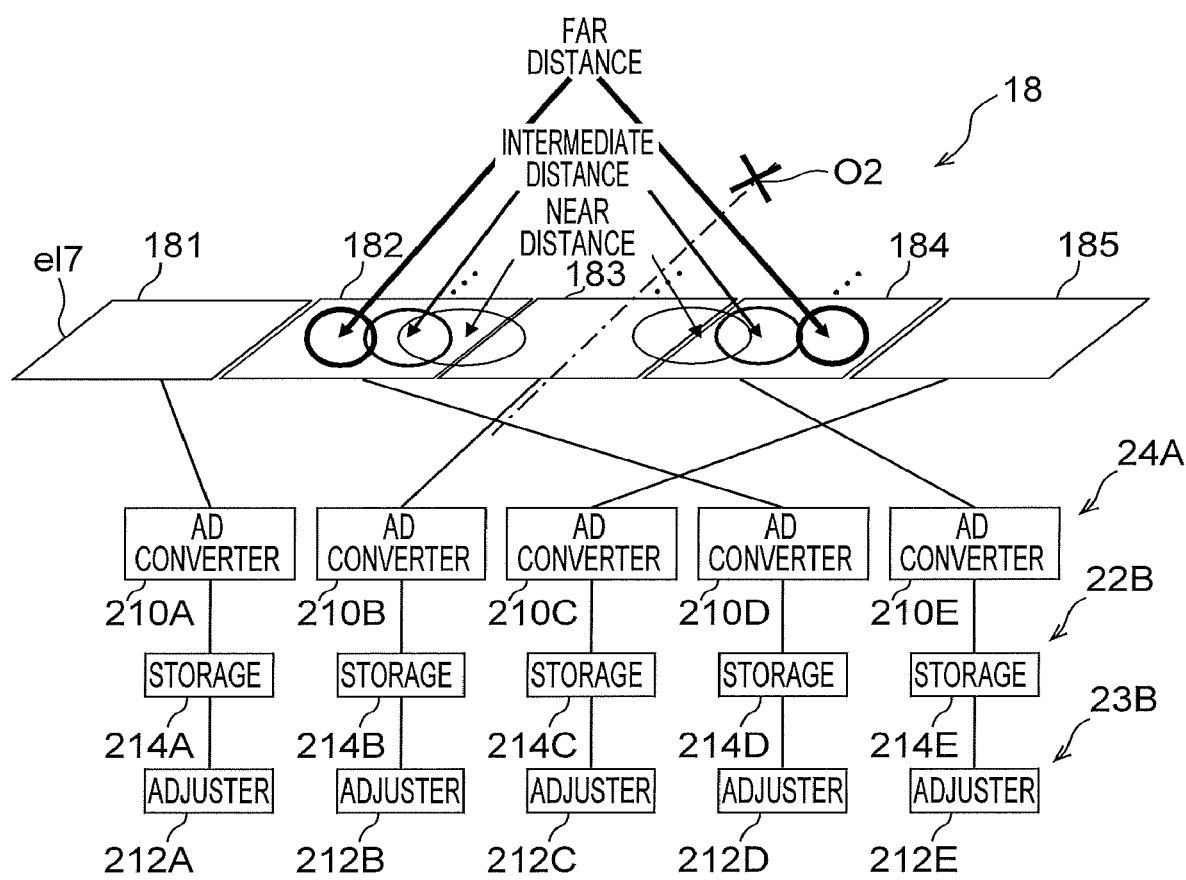
FIG. 19 is a diagram showing a relation between a plurality of light receiving elements disposed in a one-dimensional column and adjusters according to the modification 3.

FIG. 19 is a diagram showing a relation among the light receiving element groups 181 to 185, the AD converters 210A to 210E of the AD converter 24A, storage groups 214A to 214E of the storage 25B, and the adjuster groups 212A to 212E of the adjuster 23B. A part of a light beam of the reflected light L2 on the light receiving surface of the sensor 18 is schematically shown to correspond to the distance to the measurement target object 10. That is, as the distance to the measurement target object 10 increases, an incident position of the reflected light L2 moves to a position further away from the optical axis center of the light-receiving optical system 204.

As shown in FIG. 19, the AD converter 24A includes the AD converter groups 210A to 210E respectively connected to the light receiving element groups 181 to 185 disposed in a one-dimensional column in the vertical direction. The storage 25B includes the storage groups 214A to 214E respectively connected to the AD converter groups 210A to 210E disposed in a one-dimensional column in the vertical direction. For example, the respective AD converters 210A in the AD converter group 210A are connected to corresponding respective storages 214A in the storage group 214A. Consequently, the respective storages 214A in the storage group 214A store signals for measurement of the corresponding respective AD converters in the AD converter group 210A.

The adjuster 23A includes the adjuster groups 212A to 212E respectively connected to the storage groups 214A to 214E disposed in a one-dimensional column in the vertical direction. For example, the respective storages 214A in the storage group 214A are connected to the corresponding respective adjusters 212A in the adjuster group 212A. Consequently, the respective adjusters 212A in the adjuster group 212A are capable of adjusting the magnitudes of signals for measurement of the corresponding respective AD converters in the storage group 214A.

As explained above, according to the modification 3, the extractor 22 extracts the light receiving elements used for the measurement of the distance to the measurement target object 10 out of the light receiving element groups 181 to 185. The adjuster 23 adjusts, according to an amplification factor corresponding to the extracted light receiving elements, signal values of signals for measurement stored in the storage. Consequently, it is possible to generate time-series signals for measurement including, as main components, output signals of the light receiving elements corresponding to positions on the light receiving surface of the sensor 18 on which the reflected light L2 reflected by the mirror 15 should be made incident. It is possible to reduce the influence of environment light. Therefore, it is possible to reduce the influence of environment light even if the rotating speed of the mirror 15 is increased. It is possible to stably perform distance measurement.

In all the embodiments described above, all the circuits may be formed by analog circuits, or formed by digital circuits, or analog circuits and digital circuits in a mixed manner. Furthermore, each circuit may be formed by an integrated circuit (IC), an application specific integrated circuit (ASIC) or a field-programmable gate array (FPGA). Part of all of the functions may be controlled by a program, and information processing by software may be specifically implemented using hardware resources.

For example, all the device may be formed by microprocessor and/or analog circuit implemented or implemented by a dedicated circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
a light source configured to intermittently emit laser light;
an irradiation optical system configured to reflect the laser light emitted by the light source on a mirror, which cyclically changes an angle of an incident surface with respect to the laser light, and irradiate the laser light on a measurement target object,
a light-receiving optical system configured to receive reflected light of the laser light via the mirror;
a sensor including a plurality of light receiving elements configured to convert the reflected light received via the light-receiving optical system into an electric signal;
an extractor configured to extract a light receiving element used for measurement of a distance to the measurement target object among the plurality of light receiving elements, wherein the extractor extracts the light receiving element on the basis of an angular velocity of the mirror and an elapsed time from a timing when a light emission of the laser light is started;

an adjuster configured to adjust, according to an amplification factor corresponding to the light receiving element extracted by the extractor, a signal value of the electric signal of the light receiving element;

a signal generator configured to generate time-series signals for measurement on the basis of the electric signal adjusted by the adjuster; and a distance measurer configured to measure the distance to the measurement target object on the basis of a time difference between light emission timing of the laser light and timing of a peak position of the signal for measurement.

2. The distance measuring device according to claim 1, wherein the extractor extracts the light receiving element corresponding to a position on a light receiving surface of the sensor on which the reflected light reflected by the mirror is made incident.

3. The distance measuring device according to claim 1, wherein the extractor changes, according to the angle of the mirror and an elapsed time from the light emission timing of the laser light, the light receiving element used for the distance measurement and extracts the light receiving element.

4. The distance measuring device according to claim 1, wherein the extractor extracts the light receiving element on the basis of angular velocity of the mirror.

5. The distance measuring device according to claim 1, wherein, as an elapsed time from the light emission timing of the laser light increases, the extractor extracts a light receiving element in a position further away from an optical axis center of the light-receiving optical system.

6. The distance measuring device according to claim 1, wherein, as angular velocity of the mirror increases, the extractor sets, in a position further away from an optical axis center of the light-receiving optical system, a position of a light receiving element extracted when a predetermined time elapses from the light emission timing of the laser light.

7. The distance measuring device according to claim 1, wherein the adjustor sets an amplification factor of the light receiving element extracted by the extractor larger than an amplification factor of a light receiving element not extracted by the extractor among the light receiving elements included in the sensor.

8. The distance measuring device according to claim 1, wherein the adjuster sets an amplification factor of a light receiving element not extracted by the extractor to 0.

9. The distance measuring device according to claim 1, wherein
the mirror is a one-axis rotary mirror,
the sensor includes three or more light receiving elements disposed along a moving direction of the reflected light on a light receiving surface of the sensor that moves according to rotation of the rotary mirror,
the adjustor includes a plurality of adjustors corresponding to the respective three or more light receiving elements and configured to adjust magnitudes of output signals of the corresponding light receiving elements, and
the distance measuring device further comprises at least one AD converter connected to a pair or more of the adjustors corresponding to alternately disposed respective light receiving elements among the three or more light receiving elements.

10. The distance measuring device according to claim 1, wherein the mirror alternately repeats rotation in one direction and rotation in another direction, which is an opposite direction of the one direction, and shifts light emission timing of the light source at a time when the mirror is rotating in the one direction and light emission timing of the light source at a time when the mirror is rotating in the other direction.

11. The distance measuring device according to claim 1, further comprising a rotation table configured to rotate the light source, the irradiation optical system, the light-receiving optical system, and the sensor.

12. A distance measuring device comprising:
a light source configured to intermittently emit laser light;
an irradiation optical system configured to reflect the laser light emitted by the light source on a mirror or a mechanical mechanism including lens, which cyclically changes an angle of an incident surface with respect to the laser light, and irradiate the laser light on a measurement target object;
a light-receiving optical system configured to receive reflected light of the laser light via the mirror or the mechanical mechanism including lens;
a sensor including a plurality of light receiving elements configured to convert the reflected light received via the light-receiving optical system into an electric signal;
an AD converter configured to include AD converter groups connected respectively to the light receiving elements and generates a signal for measurement;
an adjuster configured to adjust, according to an amplification factor, signal values of the electric signals for measurement of the AD converter groups, wherein the adjuster changes the amplification factor based on an elapsed time from light emission timing of the laser light;
a signal generator configured to generate time-series signals for measurement on the basis of the electric signal adjusted by the adjuster; and
a distance measurer configured to measure the distance to the measurement target object on the basis of a time difference between light emission timing of the laser light and timing of a peak position of the time-series signals for measurement adjusted by the adjuster.

13. The distance measuring device according to claim 12, further comprising:
an extractor configured to extract a light receiving element used for measurement of a distance to the measurement target object, wherein the extractor extracts the light receiving element corresponding to a position on a light receiving surface of the sensor on which the reflected light reflected by the mirror is made incident.

14. The distance measuring device according to claim 13, wherein the extractor changes, according to the angle of the mirror and an elapsed time from the light emission timing of the laser light, the light receiving element used for the distance measurement and extracts the light receiving element.

15. The distance measuring device according to claim 13, wherein the extractor extracts the light receiving element on the basis of angular velocity of the mirror.

16. The distance measuring device according to claim 13, wherein, as an elapsed time from the light emission timing of the laser light increases, the extractor extracts a light receiving element in a position further away from an optical axis center of the light-receiving optical system.

17. The distance measuring device according to claim 13, wherein, as angular velocity of the mirror increases, the extractor sets, in a position further away from an optical axis center of the light-receiving optical system, a position of a light receiving element extracted when a predetermined time elapses from the light emission timing of the laser light.

18. The distance measuring device according to claim 13, wherein the adjustor sets an amplification factor of the light receiving element extracted by the extractor larger than an amplification factor of a light receiving element not extracted by the extractor among the light receiving elements included in the sensor.

19. The distance measuring device according to claim 13, wherein the mirror is a one-axis rotary mirror, the sensor includes three or more light receiving elements disposed along a moving direction of the reflected light on a light receiving surface of the sensor that moves according to rotation of the rotary mirror, the adjustor includes a plurality of adjustors corresponding to the respective three or more light receiving elements and configured to adjust magnitudes of output signals of the corresponding light receiving elements, and the distance measuring device further comprises at least one AD converter connected to a pair or more of the adjustors corresponding to alternately disposed respective light receiving elements among the three or more light receiving elements.

20. A distance measuring device comprising:

a light source configured to intermittently emit laser light;

a mirror configured to perform, with respect to a rotation axis, rotation in one direction and rotation in another direction, which is an opposite direction of the one direction;

an irradiation optical system configured to irradiate the laser beam emitted by the light source on a measurement target object via the mirror; and a controller configured to perform control of the light source such that a start timing of the light emission of the laser light shifts at each cycle from the rotation start timing of the mirror.

* * * * *